FLUID AMPLIFIER SERIAL DIGITAL COMPLEMENTER LOGIC CIRCUIT

Filed April 26, 1966

Inventor:
Robert K. Rose,
by Louis A. Moucha

United States Patent Office 3,350,010

Patented Oct. 31, 1967

3,350,010
FLUID AMPLIFIER SERIAL DIGITAL COMPLEMENTER LOGIC CIRCUIT

Robert K. Rose, Burnt Hills, N.Y., assignor to General Electric Company, a corporation of New York Filed Apr. 26, 1966, Ser. No. 545,471
12 Claims. (Cl. 235—201)

ABSTRACT OF THE DISCLOSURE

A serially-operated fluidic logic circuit for providing binary coded fluid signals representing the arithmetic complement of a digital number in binary bit code. The logic circuit comprises three OR-NOR logic fluid amplifiers interconnected by a complement-command circuit which includes a minimum of four fluid amplifiers. The digital number and its corresponding "not" logic component are supplied to two of the OR-NOR elements and the complemented number is produced at the output of the third OR-NOR element.

The invention described herein was made in the performance of work under a NASA contract and is subject to the provisions of Section 305 of the National Aeronautics and Space Act of 1958, Public Law 85–568 (74 Stat. 435; 42 U.S.C. 2457).

My invention relates to a fluid-operated logic circuit employing devices having no mechanical moving parts and known as fluid amplifiers, and in particular, to such logic circuit which provides the function of a serial digital complementer to permit the subtraction of digital numbers in binary bit form.

Fluid-operated logic circuits employing the recently developed no-moving parts devices known as fluid amplifiers have many advantages over analogous electronic circuitry. In particular, the fluid amplifier is relatively simple in design, inexpensive in fabrication, capable of withstanding extreme environmental conditions such as shock, vibration, nuclear radiation and high temperature and the no-moving parts feature permits substantially unlimited lifetime thereby achieving long periods of uninterrupted operation. This latter feature is of special significance in the computation and control systems fields where trouble-free elements are necessary to achieve such desired uninterrupted operation.

Computation and control systems may employ digital computation, analog computation or combinations thereof. The use of digital computation has several advantages over analog computation including accuracy, application flexibility and greater tolerance of undesirable ratios of noise to signals. Thus, practically any desired accuracy can be obtained by increasing the number of bits in a word or number which is expressed in binary logic digital form. Digital computations may be either serial or parallel in operation, depending upon the method of handling the binary bits which make up a digital number. Serial operation, although slower since it is performed one bit at a time, requires fewer logic elements since the same elements are used for all the bits whereas in parallel operation a separate set of elements is used for each bit. Further, the circuits may be synchronously controlled by a pulse generator conventionally described as a "clock," or, may be asynchronously controlled such that each operation triggers the next.

One of the most basic circuits employed in digital computation is the digital adder circuit which produces the summation of two digital numbers. In order to obtain the summation of two numbers wherein one number is negative such that a subtract operation must be accomplished, there is the need to obtain the arithmetic complement of the negative number which then is added to the other (positive) number in the adder circuit.

Therefore, one of the principal objects of my invention is to provide a new fluid-operated serial digital complementer logic circuit.

Another object of my invention is to construct the complementer circuit from elements having no moving parts and known as fluid amplifiers.

A still further object of my invention is to provide a serial digital complementer logic circuit employing a minimum number of fluid amplifiers and minimum number of different logic types of fluid amplifiers.

Briefly stated, my invention is a new fluid-operated logic circuit for providing pressurized fluid output signals which represent the arithmetic complement of a digital number in binary bit form. The logic circuit includes three interconnected OR-NOR logic digital-type fluid amplifier elements and a "complement-command" circuit. The digital number and its corresponding "not" logic component are supplied to first (control fluid inlet) inputs of a first and second of the three OR-NOR elements and the complemented number is obtained at an output of the third OR-NOR element. The complement-command circuit includes a fourth OR-NOR logic fluid amplifier element which is responsive to a fluid signal commanding a complement operation (or commanding that the digital number pass through the logic circuit unmodified) and a one-bit storage fluid amplifier circuit for ensuring that at least the first binary bit of the digital number is passed through the complementer circuit unmodified (i.e., without inversion). My particular complementer circuit utilizes arithmetic two's complement whereby all the leading binary "ZEROES" (starting from the units column) and the first binary "ONE" of the digital number are passed through the logic circiut unmodified and thereafter each successive binary bit is inverted. The particular interconnections of the three OR-NOR elements and the complement-command circuit obtain this desired two's complementer function. A minimum of 7 digital-type fluid amplifier elements may be employed in my serial digital complementer logic circuit. Numbers of any desired bit capacity may be complemented, the greater the capacity the slower the complementing operation.

The features of my invention in which I desire to protect herein are pointed out with particularity in the appended claims. The invention itself, however, both as to its organization and method of operation, together with further objects and advantages thereof, may best be understood by reference to the following description taken in connection with the accompanying drawing wherein:

The summation process in binary logic computation is obtained by adding two digital numbers in binary bit form. It is often the case that one of the digital numbers is negative such that an addition process cannot be directly obtained. In this latter case, the summation process is accomplished by complementing the negative number and thence adding such complemented number to the positive number. Thus, subtraction is performed by adding a complemented number. Subtraction employing what is conventionally known as arithmetic two's complement will now be exemplified wherein the subtraction of a binary number, N, is accomplished by adding its complement, $2^B-N$, where B is the number of bits in the word or number; Let $N=20=10100$ in five bit capacity binary logic form. The complemented value of N is $2^5-20=12=01100$ in binary logic form. Assume that 20 is to be subtracted from 28;

$$\begin{array}{rl} 1\ 1\ 1\ 0\ 0 & (28) \\ +\ 0\ 1\ 1\ 0\ 0 & \text{(complement of 20)} \\ \hline 1\ 0\ 1\ 0\ 0\ 0 & (8) \end{array}$$

The sixth (overflow) binary bit in the number 8 is truncated leaving the binary number 01000 or 8 as the answer. A feature of two's complementing is the following general rule which is illustrated hereinabove by comparing the number 20 (=10100) with its complement 01100; to compute the two's complement, starting from the units column, pass all leading ZEROES and the first ONE of the number, thereafter invert each succeeding binary bit.

Figure 1:
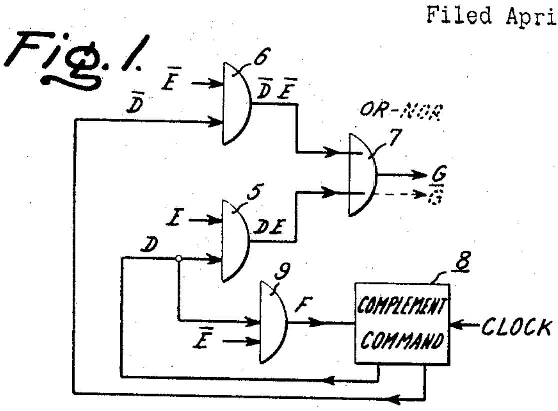
FIGURE 1 is a complementer logic diagram which employs AND and OR-NOR logic.

Referring now to the drawings, and restricting the description to fluid-operated devices, in FIGURE 1 there is shown a complementer logic diagram employing both AND and OR-NOR logic to accomplish the two's complementer function. The number to be complemented, input signal E, is supplied from a logic source (not shown) as a digital number in pressurized fluid binary bit form wherein a high pressure state or presence of a pressurized fluid square wave pulse represents a binary ONE bit, and a low pressure state (in general, the ambient pressure) or absence of the pulse represents a binary ZERO bit. The logic source may comprise a fluid amplifier logic circuit or a transducer for converting a particular system parameter or condition into a digital number in pressurized fluid binary bit form. The input signal E and its corresponding "not" input signal $\overline{E}$ which is generally also available, are supplied as first inputs to AND gate logic elements 5 and 6, respectively. "Individual bit inversion" signal D and "not" signal $\overline{D}$, in pressurized fluid binary bit form, are supplied as second inputs to AND logic elements 5 and 6, respectively, and determine whether an individual concurrently applied binary bit of E and $\overline{E}$ is to be passed directly to an OR gate logic element 7 (i.e., unmodified) or is to be passed through the complementer circuit prior to forming an output pressurized fluid binary bit signal G at the output of OR element 7.

The individual bit inversion signal D is also supplied to a first input of a third AND gate logic element 9 and the "not" signal $\overline{E}$ is supplied as a second input thereto. The output of AND element 9, designated F ($=D\overline{E}$), is supplied to a complement-command circuit 8 which provides the signals D and $\overline{D}$ at the outputs thereof. Complement-command circuit 8 includes a one-bit storage circuit for storing signal F for the time duration between successive timing pulses which synchronize operation of the complementer circuit. The timing pulses are supplied in the form of periodic pressurized fluid pulses from a source (not shown) herein designated "CLOCK." The fluid interconnections (solid lines) between the various circuit components are provided with arrowheads to indicate the direction of signal flow. OR element 7 may be employed as an OR-NOR element (NOR indicated in dashed line) when a corresponding output "not" signal $\overline{G}$ is desired.

The Boolean equations for the FIGURE 1 complementer logic diagram are:

$$G=\overline{D\overline{E}}=DE \qquad (1)$$

$$F=D\overline{E} \qquad (2)$$

where $D\overline{E}$ is conventional logic designation for "D and not E," and the plus (+) sign represents the word "or."

The operation of the complementer circuit of FIGURE 1 will now be briefly described. As mentioned hereinabove, in forming the two's complement, all leading binary ZEROES and the first binary ONE of the digital number (E) to be complemented are passed (to G) unmodified and all succeeding binary bits are inverted. Assume initially that signal D is present (i.e., a binary ONE) in which case the leading bit of E is passed through AND element 5 and OR element 7 to G. Further, assume that this leading binary bit of digital number E is a binary ONE. Since, following the first binary ONE, succeeding bits of E are inverted, the control must be transferred from AND element 5 to the AND element 6. This is accomplished by the application of signals D and $\overline{E}$ to the AND element 9 thereby producing signal F (as a binary ZERO) which is then stored for a duration of one-bit time (time interval between successive timing pulses) to allow the first binary bit of E to pass directly to G. Signal F then reappears at the output of complement-command circuit 8 as a D signal of binary ZERO at the next bit time. The absence (binary ZERO) of D then causes F to be absent and thus D remains absent, that is, the complement-command circuit 8 is effectively by-passed for the remaining bits in input signal E until the following word E is introduced.

Equations 1 and 2 employ both AND and OR-NOR logic. Since it is desired to employ a minimum number of different types of fluid amplifier elements in my complementer circuit, and since a particular OR-NOR logic fluid amplifier to be hereinafter described is of the active type thereby providing amplification as opposed to the passive AND logic fluid amplifier, my invention is directed to providing a two's complementer circuit which employs only OR-NOR logic.

Equations 1 and 2 and associated equations can be described in pure OR-NOR logic as follows:

$$\overline{G}=\overline{(\overline{D}+E)}+\overline{(D+\overline{E})} \qquad (3)$$

$$G=\overline{\overline{(\overline{D}+E)}+(D+\overline{E})} \qquad (4)$$

$$\beta=\overline{D+\overline{E}} \qquad (5)$$

$$F=\overline{\overline{D}+E} \qquad (6)$$

Figures 2, 4:
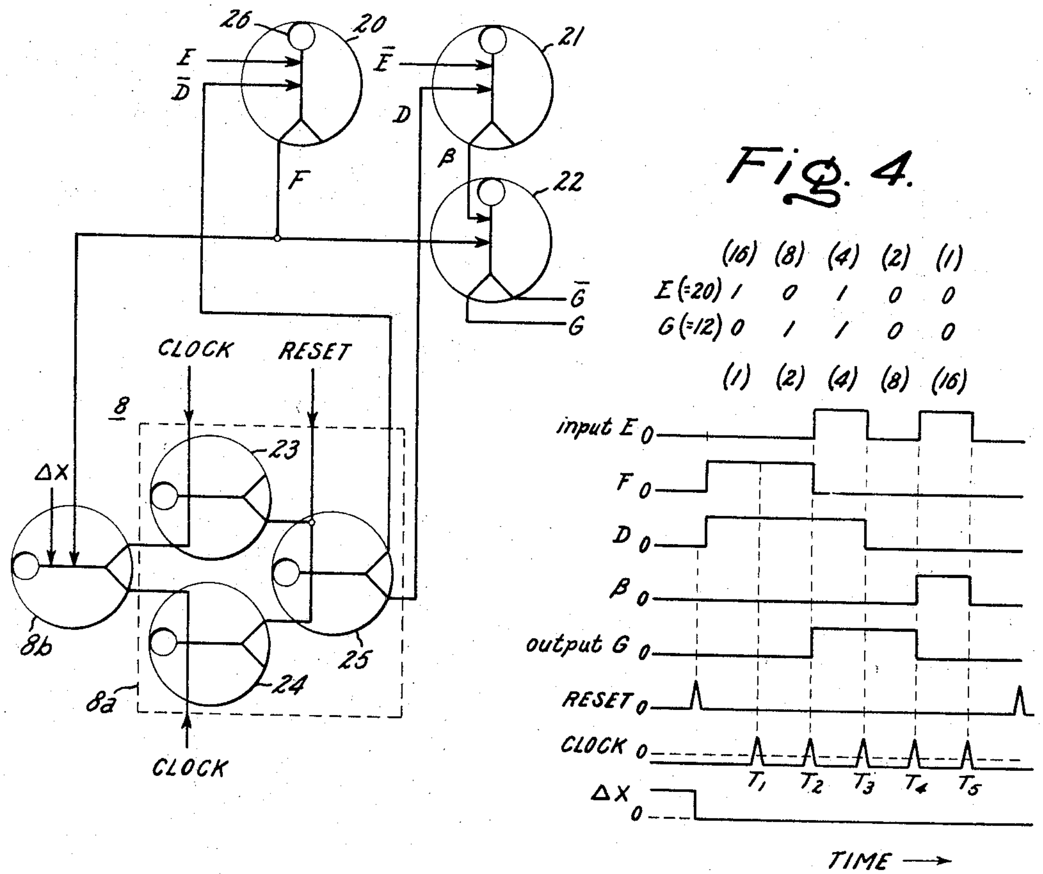
FIGURE 2 is a detailed schematic diagram of the serial digital complementer logic circuit constructed in accordance with my invention wherein only OR-NOR logic is employed.
FIGURE 4 is a timing diagram of various pressurized fluid wave forms useful in explaining the operation of my complementer logic circuit.

Equations 3 through 6 are implemented as shown in FIGURE 2 by employing three interconnected OR-NOR logic type fluid amplifier elements 20, 21 and 22 and a complement-command circuit designated as a whole by number 8. Complement-command circuit 8 includes a one-bit storage circuit 8a and a fourth OR-NOR logic fluid amplifier 8b which performs a logic operation to be hereinafter described .

Figure 3:
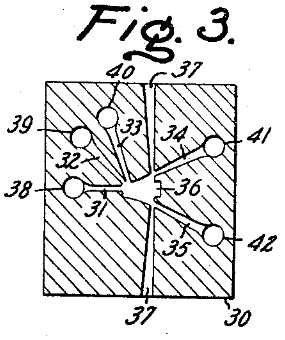
FIGURE 3 is a diagrammatic view in top plan of the OR-NOR logic fluid amplifier element employed in my circuit.

The details of the FIGURE 2 complementer circuit constructed in accordance with my invention will now be considered. The OR-NOR logic elements 20, 21, 22 and 8b are monostable digital-type fluid amplifiers of the active type, that is, having a pressurized supply of power fluid and thus, in general, not requiring additional amplification of the output signals. A detailed description of this OR-NOR element is given in U.S. Patent No. 3,232,-533 to W. A. Boothe, and assigned to the same assignee as the present invention, and in particular with reference to FIGURE 2 therein. It will suffice herein to summarize the structure and operation of the OR-NOR element with reference to FIGURE 3 as follows: The OR-NOR element includes a power fluid inlet 31 and first and second control fluid inlets 32 and 33, each terminating in a restrictor for respectively forming a pressurized continuous power jet of fluid and pressurized intermittent control fluid jets directed against the same side of the power jet. The OR-NOR device is monostable in operation in that, if neither control fluid inlet 32 NOR 33 are supplied with pressurized control fluid, the power jet is directed to be normally received within a first fluid receiver (output flow passage) 34 downstream of the power fluid inlet. A second output passage 35 is provided for receiving the flow of fluid from the power jet only during the deflection thereof by a control jet from either control fluid inlet 32 OR 33 or both. The OR-NOR logic element of FIGURE 3, although not necessarily of the boundary layer effect type, is a digital-type fluid control device in that it provides mutually exclusive pressurized fluid outputs having a substantially square wave form. Indentation 36, provided intermediate the first and second output passages, imparts a vortex action to the power jet to enhance the deflection thereof and to compact the fluid therein to aid in creating the substantially exclusive flow of power fluid in a selected one of output passages 34 and 35. Vents 37 serve to provide passages for removing excess fluid from the region of deflection of the power jet. The fluid connections to the OR-NOR device and interconnections within the complementer circuit may be accomplished by any of a number of means such as the indicated vertical conduits 38 through 42 or by the provision of appropriate fluid passages to the other fluid amplifier devices which may be formed within the same base member 30 to thereby minimize the number of external fluid couplings and external connections in the complementer circuit.

The power fluid inlets (represented by the small circles 26) for each of the fluid amplifier elements illustrated in FIGURE 2 may be supplied from a common source of continuously pressurized fluid. The arrowheads within each of the larger circles outlining the schematic symbol of an OR-NOR element represent the control fluid inlets and also indicate the direction of signal flow. The short legs of the Y within each of the circular schematic symbols of a fluid amplifier element represent the output passages thereof.

The particular interconnections of the four OR-NOR elements 20, 21, 22, 8b and the one-bit storage circuit 8a is determined from the OR-NOR logic Equations 3 through 6. Thus, input signal E comprising substantially square wave pressurized fluid pulses representing the binary logic bits heretofore described, and corresponding "not" signal $\overline{E}$ are supplied to first control fluid inlets of OR-NOR elements 20 and 21, respectively. Signal E (and $\overline{E}$) represents the digital number in binary bit form which is complemented in accordance with an appropriate "complement command" signal ΔX to be hereinafter described. The "not" signal $\overline{E}$ is, in general, available from the logic source (not shown) generating signal E, or alternatively, may be easily developed therefrom. Second control fluid inlets of OR-NOR elements 20 and 21 are supplied with the individual bit inversion signals $\overline{D}$ and D, respectively, which are provided at the output of one-bit storage circuit 8a. Thus, OR-NOR element 20 implements Equation 6 and OR-NOR element 21 implements Equation 5. The nonvented fluid outputs of OR-NOR elements 20 and 21 which provide the pressurized fluid signals F and $\beta$, respective, are in fluid communication with control fluid inlets of OR-NOR element 22 that provides at the output thereof the output signals G and $\overline{G}$. Signals G and $\overline{G}$ represent either the unmodified input digital numbers E and $\overline{E}$ or the complement thereof as dictated by complement-command signal ΔX. The nonvented output of OR-NOR element 20 is also connected to a first control fluid inlet of OR-NOR element 8b to supply signal F thereto. The second control fluid inlet of element 8b is supplied with complement command signal ΔX whose status (high or low pressure) for the duration of an entire word determines whether the digital number E is to be complemented (i.e., E is a negative number) or passed through unmodified (i.e., E is a positive number).

The one-bit storage circuit 8a may comprise any single shift register stage and for exemplary purposes is illustrated in FIGURE 2 as a single stage of a shift register circuit described and claimed in a copending U.S. patent application S.N. 537,888, filed Mar. 28, 1966, to Howard W. Avery, entitled "Fluid Amplifier Shift Register Circuit," and assigned to the assignee of the present invention. Circuit 8a may be briefly described as comprising a pair of active (nonmemory) digital-type fluid amplifier elements 23, 24 acting as gates to provide the "shift" function and a third active (memory) digital-type fluid amplifier element 25 interconnected therewith and acting as a flip-flop to provide the "storage" function. The nonmemory feature of gate elements 23, 24 pertains to the characteristic of the power fluid jet therein which does not remain attached to either side wall of the fluid amplifier interaction chamber in the absence of a bias or input signal whereas the memory capability of the flip-flop element 25 refers to its bistable characteristics.

In a particular digital computation circuit application of my complementer circuit, such as a digital integrator, the hereinabove digital-type fluid amplifier elements known as the flip-flop, gate and OR-NOR logic element may be employed throughout the remainder of the integrator circuit. Thus, to minimize the number of different types of fluid amplifier elements used in circuits such as the digital integrator, my complementer circuit is constructed from only the three different type elements herein described.

In a particular digital integrator application of my complementer circuit, the two outputs of OR-NOR element 22 are connected to control fluid inlets of two OR-NOR elements in a first half-adder circuit described in my copending U.S. patent application, S.N. 537,907, filed Mar. 28, 1966, entitled, "Fluid Amplifier Serial Digital Adder Logic Circuit," and assigned to the assignee of the present invention. The two output signals G and $\overline{G}$, being of push-pull nature, are both employed when the subsequent circuit has need for such push-pull signal. There are many applications, however, wherein only a single-sided signal is necessary and in such case the $\overline{G}$ output of OR-NOR element 22 is vented to the atmosphere.

The operation of my complementer circuit will now be more fully described with reference to the schematic diagram in FIGURE 2 and the timing diagram of FIGURE 4 wherein the digital number $E=20$ is illustrated as undergoing a two's complement operation resulting in the complemented number $G=12$. The binary logic representation of the digital number E and its complement G are indicated in the upper (table) portion of FIGURE 4. A timing diagram of various pressurized fluid waveforms in the complementer circuit is illustrated in the lower part of FIGURE 4 wherein "time" and "fluid pressure" are measured along the abscissa and ordinate, respectively. The zero base line for each wave form represents ambient pressure, and in the case of signals E, F, D, $\beta$, G, RESET and ΔX, the zero base line represents the absence of a pulse, that is, a binary logic "ZERO."

Prior to the application of the first binary bit of each input signal E, a pressurized fluid RESET pulse obtained from a suitable source (not shown) is applied to a control fluid inlet of flip-flop element 25 to ensure that the power fluid jet of storage flip-flop element 25 is directed to the output designated D, thereby ensuring that signal D is initially present (a binary ONE) as required in implementing the aforementioned rule of two's complementer operation wherein at least the first binary bit (of E) is passed through unmodified. Thus, prior to $T_1$ (the first timing or CLOCK pulse), signal D at the control fluid inlet of OR-NOR element 21 is a binary ONE: and signal $\overline{D}$ at OR-NOR element 20 is conversely a binary ZERO: and concurrently therewith, the leading binary bit of input number E, a binary ZERO, is supplied to the control fluid inlet of OR-NOR element 20 and, conversely, a binary ONE is supplied as not signal $\overline{E}$ to OR-NOR element 21. As a result of these signals immediately prior to time $T_1$, the F and $\beta$ outputs of elements 20 and 21 comprise a binary ONE and a binary ZERO, respectively, thereby producing a binary ZERO at the G output of OR-NOR element 22 as required in view of the aforementioned rule of the two's complement operation.

At approximately the same time of the RESET pulse, complement-command signal $\Delta X$ is supplied to OR-NOR element 8*b* in the complement command circuit 8. Signal $\Delta X$ determines whether input signal E is a positive or negative number. Thus, a high pressure state of signal $\Delta X$ for the duration of input word E determines that E is not to be complemented, but is to be passed through unmodified since the D output of flip-flop 25 is maintained at a binary ONE state for the entire duration of the particular number E. In like manner, the absence or low pressure state of signal $\Delta X$ indicates that E is a negative number and is to be complemented.

In the particular example of complementing number 20, immediately prior to time $T_1$, the control fluid signals applied to OR-NOR element 8*b* are $\Delta X$=binary ZERO, $F$=binary ONE, causing the power fluid output thereof to be directed to the control fluid inlet of gate element 24 in communication therewith. Since the complement process in my circuit is serial, the logic signal at the output of element 8*b* must be stored until the next bit of E (and thus F) is available. This one-bit storage is accomplished in the same manner as described in my aforementioned copending patent application, and reference thereto, and to the aforementioned copending patent application to Avery is directed for a complete explanation of the one-bit storage operation. It will suffice herein to specify that during this interval immediately prior to the first clock pulse $T_1$, as well as any time in the absence of a clock pulse $T_n$, the gate elements 23, 24 in the one-bit storage circuit are biased by a subambient pressure such that the outputs thereof are vented to the atmosphere, regardless of any logic control fluid signal from element 8*b*, as indicated by the off-zero setting in the clock wave form. However, application of a clock pulse passes (shifts) the signal at the output of OR-NOR element 8*b* to the input of flip-flop 25 for storage therein until application of the next clock pulse. Thus, application of clock pulse $T_1$ passes the logic signal F through the one-bit storage circuit 8*a*, and it follows that the individual bit inversion signal D provided at the output of flip-flop element 25 is the signal F delayed by the interval of one binary bit, that is, the interval between successive clock pulses. This relationship in the sequence of signals D and F is clearly illustrated in FIGURE 4.

At time $T_1$, the second bit of input signal E (a binary ZERO) is supplied to element 20, causing the same chain of events as described hereinabove with respect to the first ZERO bit of signal E. The individual bit inversion signal D remains a binary ONE since signal F was previously a binary ONE (and also remains a ONE for the interval between $T_1$ and $T_2$). As a result of D, E and thus F and $\beta$ remaining the same, output signal G remains a binary ZERO.

At time $T_2$, the third bit of input signal E (a binary ONE) is introduced, causing signal F to change to a binary ZERO. Signal D remains a binary ONE since it is the previous F signal after passage through the one-bit storage. Signal $\beta$ remains a binary ZERO since D remains a binary ONE, even though $\overline{E}$ is now a binary ZERO. The effect of both signals F and $\beta$ being binary ZERO is to cause output signal G to change to a binary ONE. The remainder of the complement operation proceeds in like manner from clock pulses $T_3$ to $T_5$ as clearly shown in the timing diagram. It may be seen from a comparison of the E and G signal wave forms that the two's complement rule is followed in that the first two binary ZEROES and the first binary ONE of signal $E$=00101 are passed through unmodified, and the succeeding bits are inverted.

Synchronization of operation of my complementer circuit is maintained by application of the periodic pressurized fluid timing (shift) pulses to the indicated control fluid inlets of gate elements 23, 24, which perform the "shift" operation. The frequency of the timing (CLOCK) pulses in pulses per second divided by the number of binary bits in a word (digital number E) is equal to the number of word complements that can be performed by my circuit in one second. Thus, employing the illustrated example of five bit words and a clock frequency of 240 cycles per second, 48 word complements per second are performed. A clock frequency of 1000 cycles per second is considered to be a relatively fast operating speed but is not to be construed as a limitation. It should be apparent that numbers of any desired bit capacity may be complemented, the greater the capacity, the slower the complementing operation.

It is apparent from the foregoing that my invention attains the objectives set forth. In particular, my invention provides a fluid-operated serial digital complementer logic circuit which is constructed from the elements known as fluid amplifiers having no mechanical moving parts. The complete complementer circuit is comprised of four fluid amplifiers of the OR-NOR logic type and a one bit storage circuit. Thus, my digital complementer circuit has the advantage of employing a minimum number of fluid amplifiers and minimum number of different types of fluid logic elements. In my particular complementer circuit illustrated, the number of different types of fluid amplifier elements is limited to three and all are of the active type thereby no necessitating intermediate stages of fluid amplification and thus obtaining a higher speed of circuit operation. Advantages in standardizing on a minimum number of different type fluid amplifier elements are the capability of operating all of the elements at a common power (fluid) pressure and permitting use of modular design and its resultant simplification in assembly and packaging of the entire complementer circuit. Another advantage of my serial complementer circuit is that information is generally transmitted in serial form, and thus no additional serial-to-parallel and parallel-to-serial converters are required with my circuit.

Having described a new fluid-operated logic circuit for providing a serial digital complementer function, it is believed obvious that modification and variation of my invention is possible in light of the above teachings. Thus, a buffer amplifier of the digital nonmemory type such as elements 23, 24 may be connected between the outputs of element 25 and the inputs to elements 20, 21, if desired. In such latter case the connections between element 25 and elements 20, 21 are obviously interchanged. It is, therefore, to be understood that changes may be made in the particular embodiment of my invention described which are within the full intended scope of the invention as defined by the following claims.

What I claim as new and desire to secure by Letters Patent of the United States is:

1. In a fluid-operated OR-NOR logic circuit for providing a serial digital two's complementer function and having no mechanical moving parts, first fluid amplifier means responsive to pressurized fluid signals representing a digital number E in binary bit form to be complemented in arithmetic two's complement, second fluid amplifier means responsive to pressurized fluid signals representing a corresponding "not" logic digital number $\overline{E}$ in binary bit form, said first and second fluid amplifier means further responsive to pressurized fluid signals representing individual bit inversion signals D, $\overline{D}$ for modifying particular bits of the digital number E, means in communication with said first fluid amplifier means for generating the bit inversion signals D, $\overline{D}$, and third fluid amplifier means interconnected with an output of each of said first and second fluid amplifier means for providing at the output of said third fluid amplifier means pressurized fluid signals representing the two's complement of the digital number E in binary bit form.

2. In the fluid-operated OR-NOR logic circuit set forth in claim 1 wherein said fluid amplifier means are each of a monostable active type adapted to provide an OR-NOR logic function.

3. In the fluid-operated OR-NOR logic circuit set forth in claim 1 wherein said fluid amplifier means each comprise a power fluid inlet for generating a continuous power jet of pressurized fluid, a pair of fluid receivers downstream from said power fluid inlet, and a pair of control fluid inlets positioned intermediate said power fluid inlet and said receivers and on the same side of the power jet for generating intermittent control jets of pressurized fluid directed against the same side of the power jet for causing substantially exclusive flow of the power fluid into a selected first of said receivers in response to at least one of said control fluid inlets being supplied with pressurized fluid, and into the second receiver in response to neither control fluid inlet being supplied with pressurized fluid.

4. In the fluid-operated OR-NOR logic circuit set forth in claim 3 wherein a first of said pair of control fluid inlets of said first and second fluid amplifier means is supplied with the pressurized fluid signals representing digital numbers E and $\overline{E}$, respectively, and a second of said pair of control fluid inlets of said first and second fluid amplifier means is supplied with the pressurized fluid signals representing individual bit inversion signals $\overline{D}$ and D in binary bit form, respectively, for determining the particular binary bits of the digital number E to be modified to thereby form the two's complement of E.

5. In the fluid-operated OR-NOR logic circuit set forth in claim 3 wherein said first receiver of said first and second fluid amplifier means are vented to the atmosphere, said second receiver of said first and second fluid amplifier means are in communication with said first and second control fluid inlets of said third fluid amplifier means, respectively, and said bit inversion signal generating means is in communication with said second receiver of said first fluid amplifier means (for generating) and the individual bit inversion signals are supplied to the second control fluid inlets of said first and second fluid amplifier means.

6. A fluid-operated serial digital complementer binary logic circuit having no mechanical moving parts and comprising a first fluid amplifier device responsive to pressurized fluid signals representing a digital number E in binary bit form to be complemented in arithmetic two's complement, a second fluid amplifier device responsive to pressurized fluid signals representing a corresponding "not" logic digital number $\overline{E}$ in binary bit form, a third fluid amplifier device interconnected with said first and second fluid amplifier devices in arithmetic two's complement logic relationship to provide pressurized fluid signals representing the two's complement G of the digital number E in binary bit form, and fourth fluid amplifier means interconnected with said first and second fluid amplifier devices for generating pressurized fluid signals representing individual bit inversion signals D, $\overline{D}$ in binary bit form for determining the particular binary bits of the digital number E to be modified to thereby form the two's complement of E.

7. The logic circuit set forth in claim 6 wherein said first, second and third fluid amplifier devices are each of a monostable active type adapted to provide an OR-NOR logic function, and said fourth fluid amplifier means comprise a fourth fluid amplifier device of the same type as said first, second and third fluid amplifier devices, and a one-bit storage fluid amplifier circuit.

8. The logic circuit set forth in claim 7 wherein said first, second, third and fourth fluid amplifier devices each comprise a power fluid inlet for generating a continuous power jet of pressurized fluid, a pair of fluid receivers downstream from said power fluid inlet, and a pair of control fluid inlets positioned intermediate said power fluid inlet and said receivers and on the same side of the power jet for generating intermittent control jets of pressurized fluid directed against the same side of the power jet for causing substantially exclusive flow of the power fluid into a selected first of said receivers in response to at least one of said control fluid inlets being supplied with pressurized fluid, and into the second receiver in response to neither control fluid inlets being supplied with pressurized fluid.

9. The logic circuit set forth in claim 8 wherein said second receiver of said first fluid amplifier device is in communication with said first control fluid inlet of said fourth amplifier device, and said second control fluid inlet of said fourth fluid amplifier device is supplied with a pressurized fluid complement-command signal ΔX which in a first state commands the logic circuit to complement the number E and in a second state commands the logic circuit to pass the number E through the logic circuit unmodified.

10. The logic circuit set forth in claim 8 wherein said first receiver of said first and second fluid amplifier devices are vented to the atmosphere, said second receiver of said first and second fluid amplifier devices are in communication with said first and second control fluid inlets of said third fluid amplifier device, respectively, said second receiver of said third fluid amplifier device providing the two's complement signal G, and said first receiver of said third fluid amplifier device being vented to the atmosphere when only a single-sided complement signal is desired and providing a corresponding complement "not" signal $\overline{G}$ when a push-pull signal is desired.

11. The logic circuit set forth in claim 8 wherein a first of said pair of control fluid inlets of said first and second fluid amplifier devices is supplied with the pressurized fluid signals representing digital number E and $\overline{E}$, respectively, and a second of said pair of control fluid inlets of said first and second fluid amplifier devices is supplied with pressurized fluid signals representing the individual bit inversion signals $\overline{D}$ and D, respectively.

12. The logic circuit set forth in claim 9 wherein said fluid receivers of said fourth fluid amplifier device are in communication with inputs to said one-bit storage fluid amplifier circuit, outputs of said one-bit storage circuit are in communication with said second control fluid inlets of said first and second fluid amplifier devices to respectively supply the individual bit inversion signals $\overline{D}$ and D thereto, and means in communication with said one-bit storage circuit for ensuring that at least the first binary bit of digital number E is passed through the logic circuit unmodified.

References Cited

UNITED STATES PATENTS 3,190,554 6/1965 Gehring et al. ------ 235—201

RICHARD B. WILKINSON, *Primary Examiner.*

L. R. FRANKLIN, *Assistant Examiner.*